United States Patent
Shoen

(10) Patent No.: US 7,532,345 B2
(45) Date of Patent: May 12, 2009

(54) HOST-BASED PRINTED DRIVER

(75) Inventor: Jay Shoen, Boise, ID (US)

(73) Assignee: Marvell International Technology Ltd. (BM)

( * ) Notice: Subject to any disclaimer, the term of this patent is extended or adjusted under 35 U.S.C. 154(b) by 876 days.

(21) Appl. No.: 10/840,696

(22) Filed: May 5, 2004

(65) Prior Publication Data

US 2005/0248794 A1    Nov. 10, 2005

(51) Int. Cl.
*G06F 3/12* (2006.01)
(52) U.S. Cl. .................... 358/1.15; 709/247; 382/232; 707/101
(58) Field of Classification Search ............ 358/1.13, 358/1.15
See application file for complete search history.

(56) References Cited

U.S. PATENT DOCUMENTS 5,594,860 A * 1/1997 Gauthier .................. 345/543
7,072,052 B1 * 7/2006 Tanahashi et al. ........... 358/1.1
2004/0246502 A1  12/2004 Jacobsen et al.

* cited by examiner

*Primary Examiner*—Mark K Zimmerman
*Assistant Examiner*—Dung D Tran

(57) ABSTRACT

A system includes a controller operable to receive a first data set comprising data in a first format type, the first-format-type data representing an image. The system further includes a circuit coupled to the controller, the circuit operable to produce a second data set in a second format type, the second data set based on the first-format-type data, the second data set representing the image.

17 Claims, 2 Drawing Sheets

HOST-BASED PRINTED DRIVER

BACKGROUND

Host-based printer drivers are software applications that process print data (i.e., data to be sent to a printer) on a host device, such as a personal computer. By processing the print data on the host device, the printer driver allows the host device to cooperate with printers having minimal processing capability (and, thus, a lower cost) while yielding superior print quality.

However, because such low-capability printers cannot process object-oriented graphics (e.g., vector graphics and associated text fonts), the printer driver typically converts object-oriented images into raster (bitmap) data before the printer can print the images. Unfortunately, such data conversion often places high demands on the processing resources of the host device, and thus can detract from the performance of applications simultaneously running on the host device.

SUMMARY

According to an embodiment of the invention, a system includes a controller operable to receive a first data set comprising data in a first format type, the first-format-type data representing an image. The system further includes a circuit coupled to the controller, the circuit operable to produce a second data set in a second format type, the second data set based on the first-format-type data, the second data set representing the image.

DETAILED DESCRIPTION

Most modern personal computers (PCs) are equipped with video cards (aka video adapters) that have high-level 2D and 3D graphics processing capabilities. Conventionally, PCs employ such video card processing capability solely to process data to be rendered by a video display. According to an embodiment of the invention, a host-based printer driver leverages this video card capability to process print data.

Figure 1:
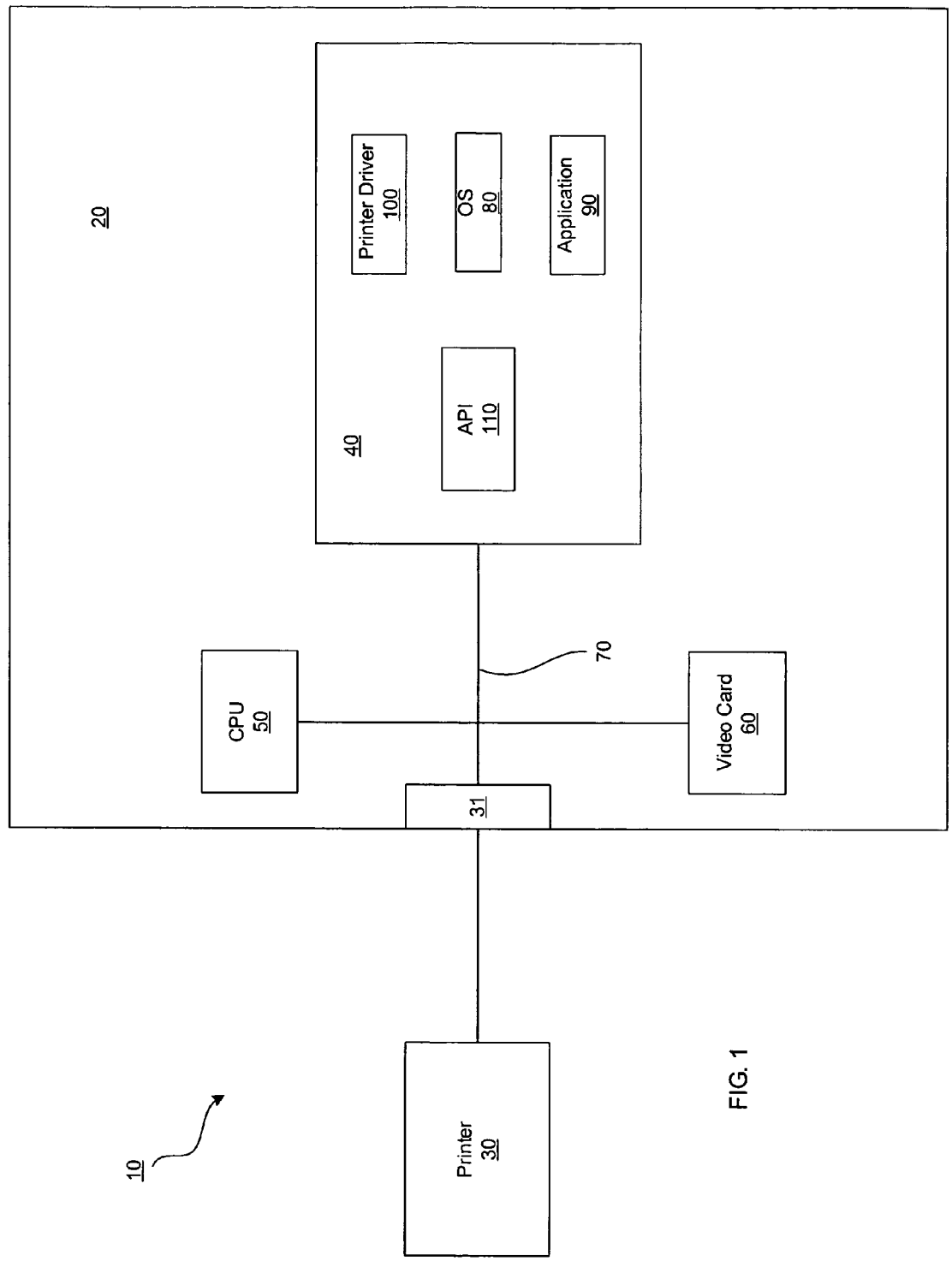
FIG. 1 is a logical block diagram of a system, according to an embodiment of the invention, for printing an image.

FIG. 1 illustrates a system 10, according to an embodiment of the invention, for printing an image. The system 10 includes a computer 20, such as a PC or workstation, coupled to a printer 30 through a printer interface 31. The computer 20 includes a memory 40 which is coupled to a computer processing unit (CPU) 50, a video card 60, and the interface 31 over a data bus 70. The memory 40 also stores an operating system (OS) 80, an application 90, a printer driver 100, and an application programming interface (API) 110. It is understood that the CPU 50 executes the OS 80, application 90, printer driver 100, and API 110 in a conventional manner.

In operation, the application 90 issues a print request, with associated print data representing an image (e.g., graphics or text), to the driver 100 through defined interfaces associated with the OS 80. The print data received by the driver 100 can be in a variety of known application-specific formats, such as, for example, bitmapped graphics, bitmapped text fonts, vector-graphics text fonts and/or vector graphics. The driver 100 converts any non-raster print data to raster data so that the printer 30 can print the associated image.

The driver 100 translates the vector-graphics-based print data into a set of executable commands. The driver 100 communicates these commands to the video card 60 for execution. In one embodiment, the driver 100 is configured to employ a high-level cross platform API 110, such as OpenGL® or DirectX, in order to communicate with the video card 60. Of course, the driver 100 can be configured to utilize other custom APIs as well.

In executing the commands received from the driver 100, the video card 60 produces bitmapped images of points, arcs, lines, text and other shapes corresponding to the vector graphics, and thus to the associated image. The commands may further instruct the video card 60 to fill, as appropriate, the rendered bitmapped shapes in a manner and with colors specified by the commands. For example, at the direction of the driver 100, the video card 60 may render overlapping objects, only a topmost object, or blended objects in the case of semi-transparent objects.

In a case where the print data includes both vector graphics and bitmap data, the driver 100 may pass the bitmap data, along-with the commands, to the video card 60. The video card 60 may cache this bitmap data in a memory (not shown) of the video card 60, and later place the bitmap data in an appropriate location of the image rendered by the video card 60.

Once the video card 60 has rendered into bitmap format the image (or portion thereof) associated with the print data, the video card 60 communicates the bitmapped image to the memory 40. The driver 100 may then employ the CPU 50 to perform any necessary post processing of the rendered image before providing the image to the printer 30, via the interface 31, for printing.

As discussed above, video cards are conventionally used to process data for display on video monitors. Standard video monitors are capable of displaying far fewer pixels than can be displayed on a printed page. If a particular print-data set represents an image that, when in bitmap format, requires a large number of pixels, the video card 60 may not be able to render the entire image.

Figure 2:
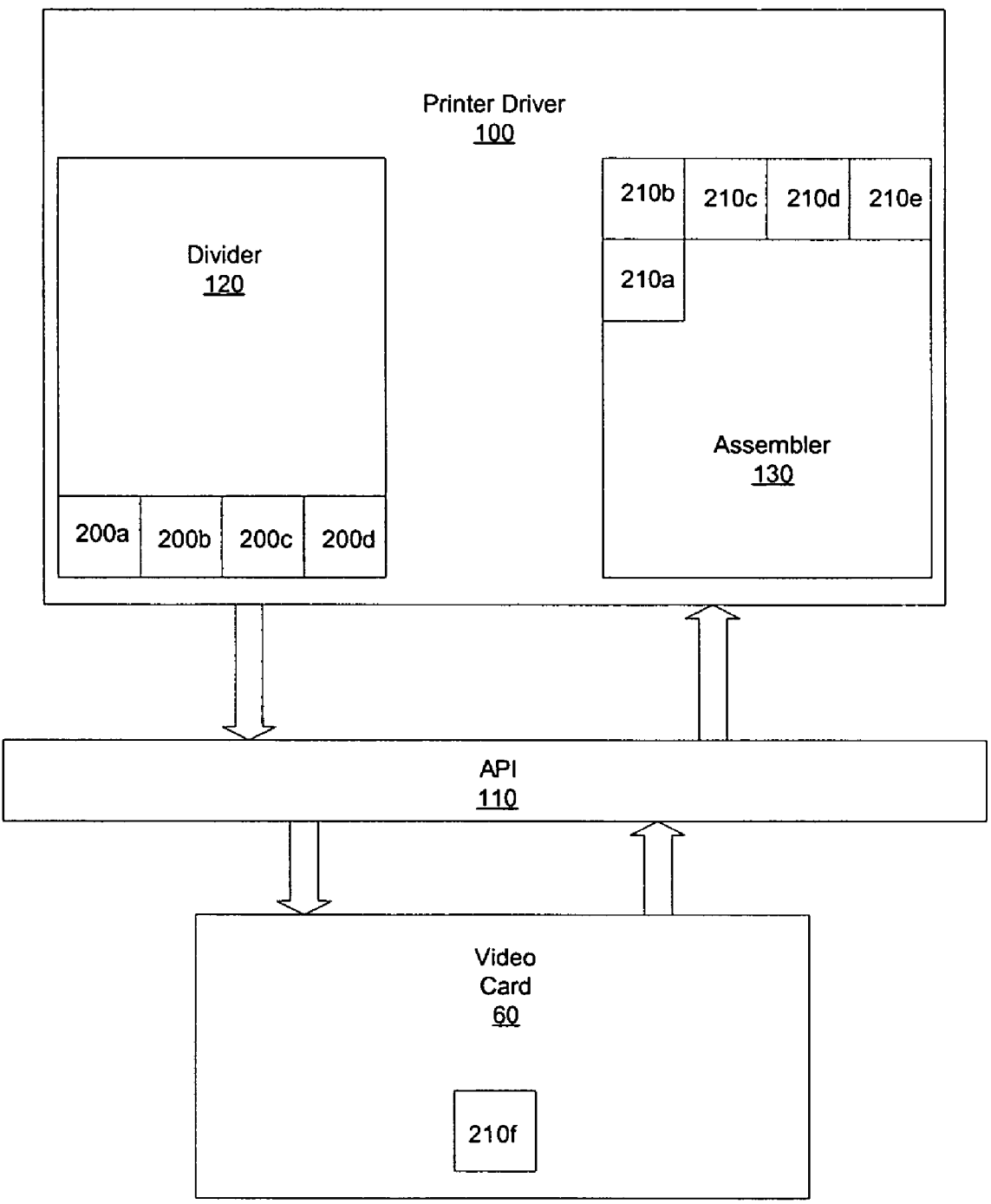
FIG. 2 is a logical block diagram illustrating interaction among components of the system of FIG. 1 according to an embodiment of the invention.

As illustrated in FIG. 2, an embodiment of the driver 100 includes a divider 120 and an assembler 130. The divider 120 is operable to divide into portions 200 (only portions 200a-200d shown) a print-data set received from the application 90. The driver 100 translates each vector-graphic portion 200 into a corresponding instruction set and serially issues each instruction set to the video card 60 for execution. Each instruction set, once executed by the video card 60, produces a corresponding bitmap portion 210 that the video card 60 subsequently provides to the assembler 130. The assembler 130 is operable to assemble the bitmap portions 210 into the complete bitmapped version of the image. The driver 100 then provides the assembled bitmapped image to the printer 30.

In an alternative embodiment, the driver 100 may allocate a subset of the data portions 200 to the video card 60 for processing. The driver 100 itself may then process the data portions 200 not allocated to the video card 60 to produce corresponding bitmap portions 210. The processing by the driver 100 of data portions 200 may or may not be simultaneous with processing by the video card 60 of data portions 200.

The preceding discussion is presented to enable a person skilled in the art to make and use the invention. Various modifications to the disclosed embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A system comprising:

a central processor;

a video processor for providing video to a video display;

print memory accessible to the central processor and video processor;

an interface for providing data communications between the printer driver and the video processor;

a printer driver executable by the processor and operable to receive a first data set comprising data in a first format, the first data set representing an image that is to be printed; and where the printer driver is operable to produce a second data set in a second format from the first data set, where the printer driver is operable to divide the first data set into multiple portions, and to provide the video processor with the second data set in multiple portions corresponding to the multiple portions of the first data set; and where the video processor is operable to process each of the multiple portions of the second data set to generate a third data set in a third data format to an assembler of the printer driver for assembly and storage in the print memory as print data.

2. The system of claim 1 wherein the first format comprises vector graphics.

3. The system of claim 1 wherein the second format comprises raster data.

4. The system of claim 1 wherein the first data set further comprises data in the second format.

5. The system of claim 1 wherein the video processor is operable to cache the processed data.

6. A system comprising:

central processing means for processing instructions and data;

video processing means for providing video to a video display;

print memory means for storing printable data, where the print memory means is accessible to the central processing means and the video processing means;

printer driver means executable by the central processing means for receiving a first data set comprising data in a first format, where the first data set represents an image that is to be printed;

interface means for providing data communications between the printer driver means and the video processing means;

where the printer driver means is operable to divide the first data set into multiple portions, and to communicate with through interface means with the video processor means to provide the video processor means with the second data set in multiple portions corresponding to the multiple portions of the first data set, wherein the video processing means generates a third data set in a third data format from the second data set, where the video processor means communicates through the interface means with an assembler of the printer driver means for assembly and storage of the third data set in the print memory means as print data.

7. The system of claim 6, where the first format comprises vector graphics.

8. The system of claim 6, where the second format comprises raster data.

9. The system of claim 6, where the first data set further comprises data in the second format.

10. The system of claim 6, where the video processing means is operable to cache the processed data.

11. A method for operating a system comprising:

providing video from a video processor to a video display;

providing a first data set comprising data in a first format to a printer driver, the first data set representing an image that is to be printed;

operating the printer driver to divide the first data set into multiple portions to generate a second data set in a second data format corresponding to the multiple portions of the first data set;

providing the second data set to the video processor to generate a third data set in a third data format from the second data set;

providing the third data set to the printer driver to assemble and store the third data set in a print memory as print data.

12. The system of claim 1 where the printer driver is executable by the central processor to produce a fourth data set in the third data format from the first data set for assembly and storage with the third data set generated by the video processor.

13. The system of claim 6 where the printer driver means is executable by the central processing means to produce a fourth data set in the third data format from the first data set for assembly and storage with the third data set generated by the video processing means.

14. The method of claim 11 further comprising operating the printer driver to produce a fourth data set in the third data format from the first data set for assembly and storage with the third data set generated by the video processor.

15. The system of claim 1 where the central processor executes a post-processing operation on the print data.

16. The system of claim 6 where the central processing means executes a post-processing operation on the print data.

17. The method of claim 11 further comprising executing a post-processing operation on the print data.

* * * * *

UNITED STATES PATENT AND TRADEMARK OFFICE
CERTIFICATE OF CORRECTION

| | | |
|---|---|---|
| PATENT NO. | : 7,532,345 B2 | Page 1 of 1 |
| APPLICATION NO. | : 10/840696 | |
| DATED | : May 12, 2009 | |
| INVENTOR(S) | : Jay Shoen | |

It is certified that error appears in the above-identified patent and that said Letters Patent is hereby corrected as shown below:

On the Title Page

Item (54), replace "PRINTED" with --PRINTER--.

Column 1, in the title, replace "PRINTED" with --PRINTER--.

Signed and Sealed this

Fourth Day of August, 2009

JOHN DOLL
*Acting Director of the United States Patent and Trademark Office*